(No Model.) 2 Sheets—Sheet 2.

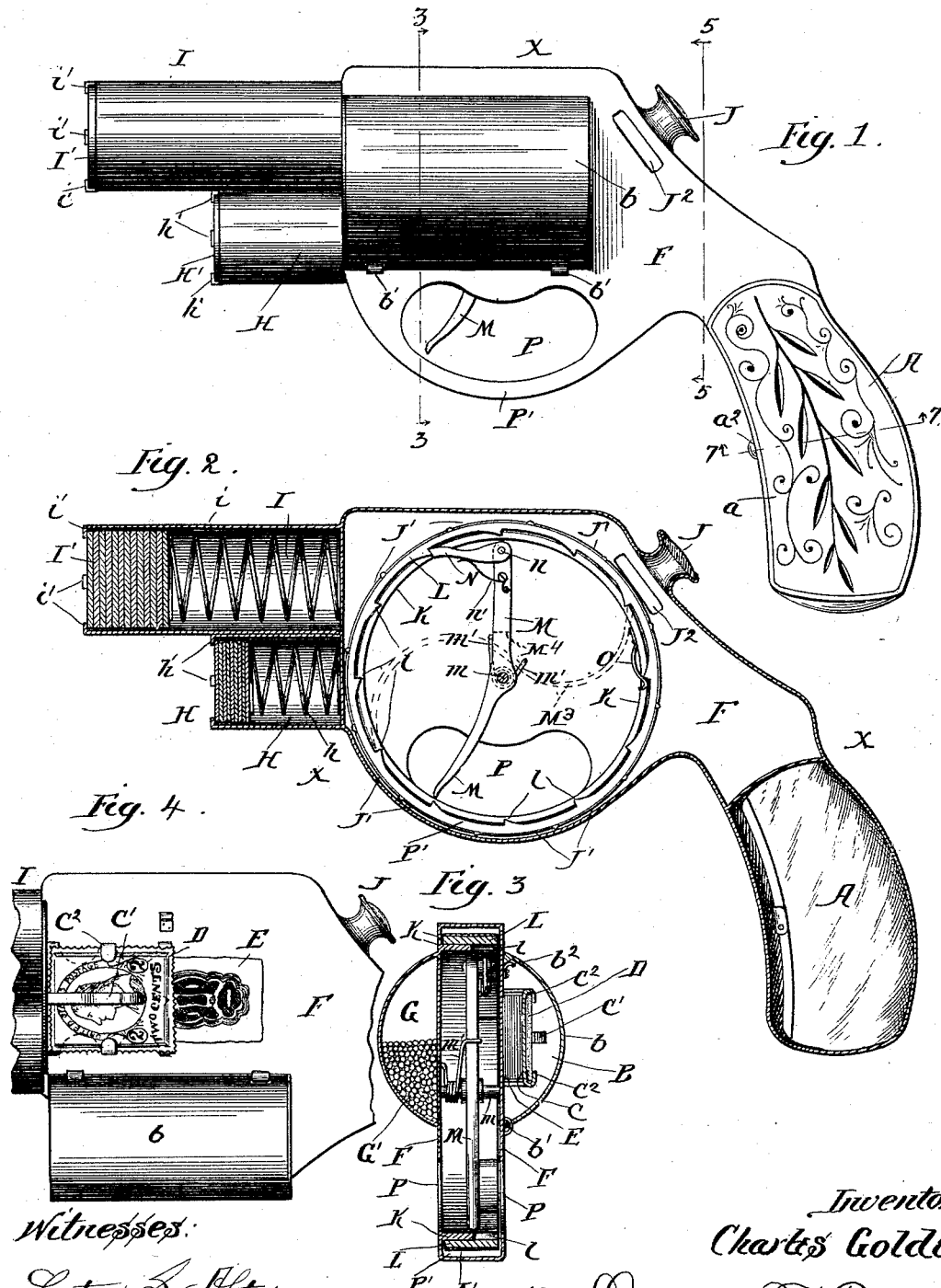

C. GOLDEN.
MOCK PISTOL.

No. 476,878. Patented June 14, 1892.

Witnesses:
Lide B. Alter
Tilord L. Brown

Inventor:
Charles Golden
By Charles T. Brown,
Attorney

UNITED STATES PATENT OFFICE.

CHARLES GOLDEN, OF CHICAGO, ILLINOIS, ASSIGNOR OF ONE-HALF TO SOLOMON JACOBSON, OF SAME PLACE.

MOCK PISTOL.

SPECIFICATION forming part of Letters Patent No. 476,878, dated June 14, 1892.

Application filed October 19, 1891. Serial No. 409,120. (No model.)

*To all whom it may concern:*

Be it known that I, CHARLES GOLDEN, of Chicago, in the county of Cook and State of Illinois, have invented a certain new and useful Improvement in Mock Pistols, of which the following is a description.

My invention relates to that class of articles made to resemble in general appearance a pistol, but adapted to form a receptacle for various articles.

The purpose of my invention is to obtain an article resembling in appearance pistols known as "revolvers," and is termed by me a "mock pistol," and an article adapted to serve as a receptacle for nickels, dimes, postage-stamps, car-tickets, matches, and bills or other articles ordinarily carried in a pocket-book, and, further, to serve as a holder for a series of pictures, which may be photographs, adapted to be brought into position successively by the trigger of the device, to be viewed through a magnifying-glass, forming a part of the device.

The manner in which I accomplish the purposes sought by me is fully set forth in the specification when considered in combination with the drawings accompanying and forming a part hereof, in which—

Figure 7:
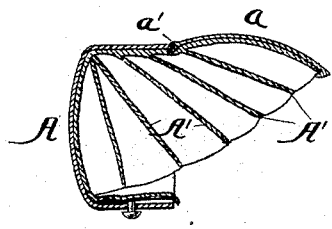
Figure 6:
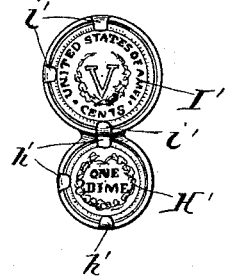
Figure 8:
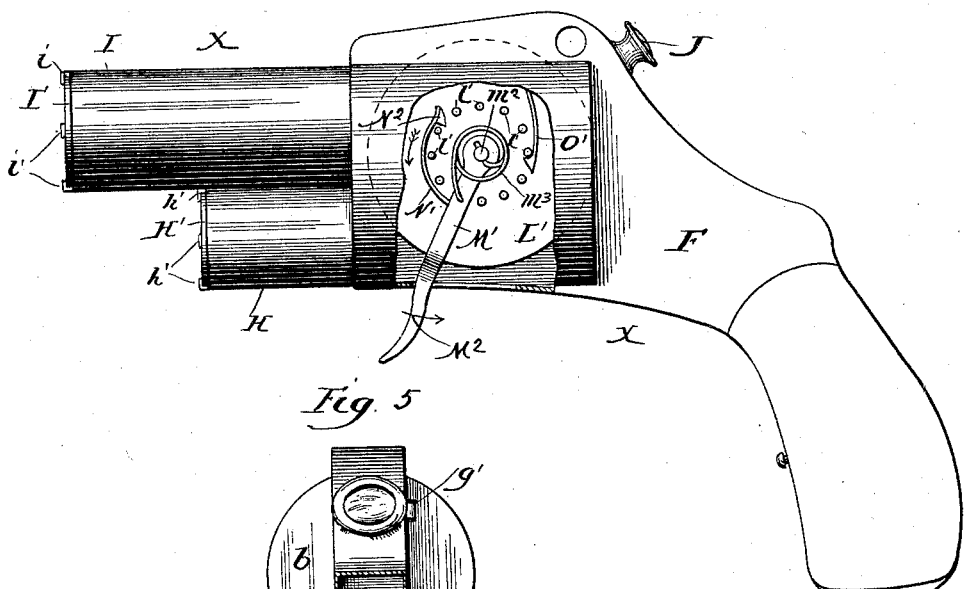
Figure 5:
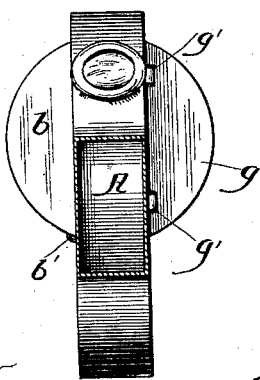

Figure 1 is a side elevation of a mock pistol; Fig. 2, a longitudinal sectional view; Fig. 3, a cross-sectional view on line 3 3 of Fig. 1, viewed in the direction indicated by the arrows; Fig. 4, a side elevation of the portion of the device serving as the postage-stamp and car-ticket receptacle with the cover thereof opened; Fig. 5, a cross-sectional view on line 5 5 of Fig. 1, viewed in the direction indicated by the arrows; Fig. 6, an end elevation of the end serving as a receptacle for dimes and nickels; Fig. 7, a cross-sectional view of the compartment contained in the handle of the device and forming the pocket-book receptacle on line 7 7 of Fig. 1, viewed in the direction of the arrows, with the cover open, showing the divisions thereof formed by suitable flexible material, as leather; Fig. 8, a side elevation showing a modification of the picture-holding device and the trigger therefor.

The same letter of reference is used to indicate the same part where more than one view thereof is shown in the several figures of the drawings.

X is the mock pistol, and A is the pocket-book in the handle of the device.

A' A' are the flexible partitions of the receptacle forming the pocket-book.

$a$ is the cover, hinged to the handle by hinge $a'$.

$a^2$ is the catch by which the cover $a$ is held in a closed position.

B is the postage-stamp and car-ticket receptacle. $b$ is the cover thereof; $b'$ $b'$, a hinge, and $b^2$ the spring-catch by which the cover is held in a closed position.

C is a table in receptacle B, forming the base on which the postage-stamps are laid and against which they are held by the spring C'.

$C^2$ $C^2$ are upturned edges of the base C.

D is a representation of a postage-stamp contained in the receptacle therefor.

E is a representation of a car-ticket in the receptacle therefor. The car-tickets are slid in between the base C and the base F, such base F forming, also, the side of the pistol and the outer casing of the ring on which the pictures to be shown by the device are secured.

G, Fig. 3, is the match-box receptacle. $g$, Fig. 5, is the cover thereof. $g'$ $g'$ are the hinges.

G is a representation of matches contained in the receptacle G.

H is a receptacle for holding dimes.

H' are dimes contained in the receptacle. $h$ is a spring tending to hold the dimes forward at the outer end of the receptacle H against the stops $h'$ $h'$ $h'$.

I is a receptacle for nickels.

I' I' are nickels contained in the receptacle.

$i$ is a spring tending to hold the nickels at the outer end of the receptacle therefor against the stops $i'$ $i'$ $i'$.

J is a magnifying device through which the pictures J' J' are viewed.

$J^2$ is an aperture through the sides of the device for the admission of light upon the picture. The pictures shown in this device may be photographs, engravings, lithographs, and the like.

One of the purposes for which I desire to use my invention is to contain a series of photographs of the buildings of the World's Fair, and in order to obtain room to show all of such buildings I have constructed the picture-holding device in the following manner: K is a ring secured to one of the sides F of the device. L is a revoluble ring fitting over ring K. The pictures J' J' are secured on the outside of the ring L. $l\,l$ are ratchet-teeth on the inside of ring L, upon the part thereof extending beyond the ring K. M is the trigger of the device, movable on pivot $m$. Trigger M is yieldingly held in the position illustrated in Figs. 1 and 2 by the spring $m'$, one end of such spring abutting against the trigger M and the other end thereof abutting against the side F of the device. N is a dog pivoted on trigger M by pin $n$, and $n'$ is a spring abutting at one end against the trigger M and at the other end against the dog N, tending to hold the end of the dog N in contact with the teeth $l$ in ratchet L. O is a spring tending to hold the ring L stationary. P is an aperture formed by cutting away a portion of the sides F F, and through this aperture access is had to the trigger M. By this construction it will be seen that the pictures contained on the ring L are contained in the part lettered P' of the device as the ring L revolves, as is well illustrated in Figs. 1, 2, and 3.

Where a less number of pictures are to be placed in the device, the modification illustrated in Fig. 8 may be employed. In this modification M' is the trigger, which is pivoted on the pin $m^2$ and yieldingly held in the position illustrated in Fig. 8 by the spring $m^3$, which is attached at one end to the pin $m^2$, and at the other end thereof to trigger M'. L' is the picture-holding device, consisting of a drum, on the outside of which the pictures are secured in the same manner as they are secured on the outside of the ring L, as hereinbefore described. $l'\,l'$ are pins on the drum L'. $N^2$ is a spring-dog on trigger M', adapted to engage, at the hook end thereof, (lettered $N^2$,) with the pins $l'$. O' is a spring to hold the drum L' from backward movement. It will be readily understood that when the trigger M' is moved in the direction of the arrow $M^2$ thereon the dog $N^2$, engaging with one of the pins $l'\,l'$, will rotate the drum L' a given distance in the direction indicated by the arrow thereon, and upon the releasing of the trigger M' it will regain its initial position, as illustrated in Fig. 8.

It will be evident to those skilled in the art that portions of the immovable ring K can be cut away, leaving the series of abutments arranged in a circle extending outward from the sides F F, and with the teeth $l\,l$ near the center of the ring L; and, further, I have found that by constructing the trigger M of two parts M $M^3$, the part $M^3$ consisting of spring metal bent into substantially the shape indicated by the dotted lines lettered $M^3$ in Fig. 2, the dog N may be dispensed with, the spring $M^3$ of the trigger serving as such dog. Where the spring $M^3$ is used, the trigger M is cut off, as at the point indicated by the dotted line lettered $M^4$.

Having thus described my invention, what I claim, and desire to secure by Letters Patent, is—

1. In a mock pistol, a picture-holder consisting of a rotatable ring having ratchet-teeth on the inside thereof, non-rotatable abutments arranged in the form of a ring, extending into the rotatable ring and supporting the same, around which the rotatable ring turns, a trigger pivoted to the frame of the device within the circumference of the picture-ring, a spring yieldingly holding the trigger in a forward position, and a spring-dog on the trigger, yieldingly held against the teeth of the rotatable ring, in combination with a frame resembling a pistol in form, and a magnifying-glass in such frame, through which the pictures can be viewed when brought before it, substantially as described.

2. In a mock pistol, a picture-holder consisting of a rotatable ring having ratchet-teeth on the inside thereof, a non-rotatable ring extending into the rotatable ring and supporting the same, around which the rotatable ring turns, a trigger pivoted to the frame of the device within the rings, a dog pivoted on the trigger, a spring yieldingly holding the trigger in a forward position, and a spring on the trigger, yieldingly holding the dog against the teeth of the rotatable ring, in combination with a frame resembling a pistol in form, such frame being hollow and serving as a receptacle in which articles can be placed, and a magnifying-glass in such frame, through which the pictures can be viewed, substantially as described.

3. In a mock pistol, the combination of a barrel adapted to hold coin, a spring in such barrel tending to hold its contents near the outer end thereof, a second barrel adapted to hold coin, a spring in the second barrel, tending to hold the contents thereof toward the outer end, a revoluble picture-holder, a trigger having a dog thereon adapted to actuate the picture-holder, a magnifying-glass through which the pictures may be viewed when brought into position before it, a receptacle upon one side of the picture-holder, adapted to hold car-tickets and postage-stamps, a receptacle on the other side of the picture-holder, and a receptacle in the handle of the device and movable covers to both of such receptacles, substantially as described.

CHARLES GOLDEN.

Witnesses:
S. W. BARTON,
CHARLES T. BROWN.